(12) United States Patent
Zink

(10) Patent No.: US 6,508,205 B1
(45) Date of Patent: Jan. 21, 2003

(54) FLY BITE AND BOTFLY PREVENTION LEGGING FOR EQUINE

(76) Inventor: Arden K. Zink, Box 435, Louisville, NE (US) 68037

( * ) Notice: Subject to any disclaimer, the term of this patent is extended or adjusted under 35 U.S.C. 154(b) by 57 days.

(21) Appl. No.: 09/640,922

(22) Filed: Aug. 17, 2000

Related U.S. Application Data

(60) Provisional application No. 60/166,374, filed on Nov. 18, 1999.

(51) Int. Cl.⁷ .......................... A01K 29/00; A61F 13/00
(52) U.S. Cl. .................... 119/850; 54/79.3; 54/79.4; 54/82; 128/882; 128/894
(58) Field of Search ................... 119/850, 876; 54/68, 79.3, 79.4, 82; 128/865, 882, 878, 879, 880, 881, 892, 893, 894; D30/146, 147, 149

(56) References Cited

U.S. PATENT DOCUMENTS

| | | | | |
|---|---|---|---|---|
| 438,105 A | * | 10/1890 | Geyer | 119/850 |
| 921,435 A | * | 5/1909 | Miller | 128/856 |
| 2,279,296 A | * | 4/1942 | Bresnick et al. | 128/881 |
| 2,843,118 A | * | 7/1958 | Pelow | 128/881 |
| 3,209,516 A | * | 10/1965 | Hyman | 119/850 |
| 3,209,517 A | * | 10/1965 | Hyman | 119/850 |
| 4,719,876 A | * | 1/1988 | Wilken | 119/815 |
| 5,050,620 A | * | 9/1991 | Cooper | 128/882 |
| 5,074,289 A | * | 12/1991 | Leibinsohn | 128/882 |
| 5,115,627 A | * | 5/1992 | Scott | 128/882 |
| 5,137,508 A | | 8/1992 | Engman | 602/79 |
| 5,275,179 A | * | 1/1994 | Lonardo | 128/881 |
| 5,407,421 A | * | 4/1995 | Goldsmith | 128/882 |
| 5,408,812 A | * | 4/1995 | Stark | 119/850 |
| D375,586 S | * | 11/1996 | Caditz | D30/146 |
| 5,592,953 A | * | 1/1997 | Delao | 128/882 |
| 5,653,244 A | * | 8/1997 | Shaw | 128/882 |
| 5,676,094 A | | 10/1997 | Gun-Munro | 119/850 |
| 5,910,126 A | * | 6/1999 | Wilson et al. | 119/850 |
| 5,926,843 A | * | 7/1999 | Winchester | 119/850 |
| 6,196,985 B1 | * | 3/2001 | Slautterback | 128/880 |
| 6,276,364 B1 | * | 8/2001 | Warner | 128/846 |

* cited by examiner

*Primary Examiner*—Yvonne R. Abbott
(74) *Attorney, Agent, or Firm*—Thomte, Mazour & Niebergall; Dennis L. Thomte

(57) ABSTRACT

An article of plastic mesh fabric legging apparel worn by equines on their front and back legs to prevent flies from biting or laying Botfly eggs on their legs. Staves are utilized to prevent sagging. A fully opening vertical seam of hook and loop fasteners is used to attach the apparel on the animal. A bottom placed strap of hook and loop going around the animal's lowermost leg is used to adjust for different sized animals.

1 Claim, 3 Drawing Sheets

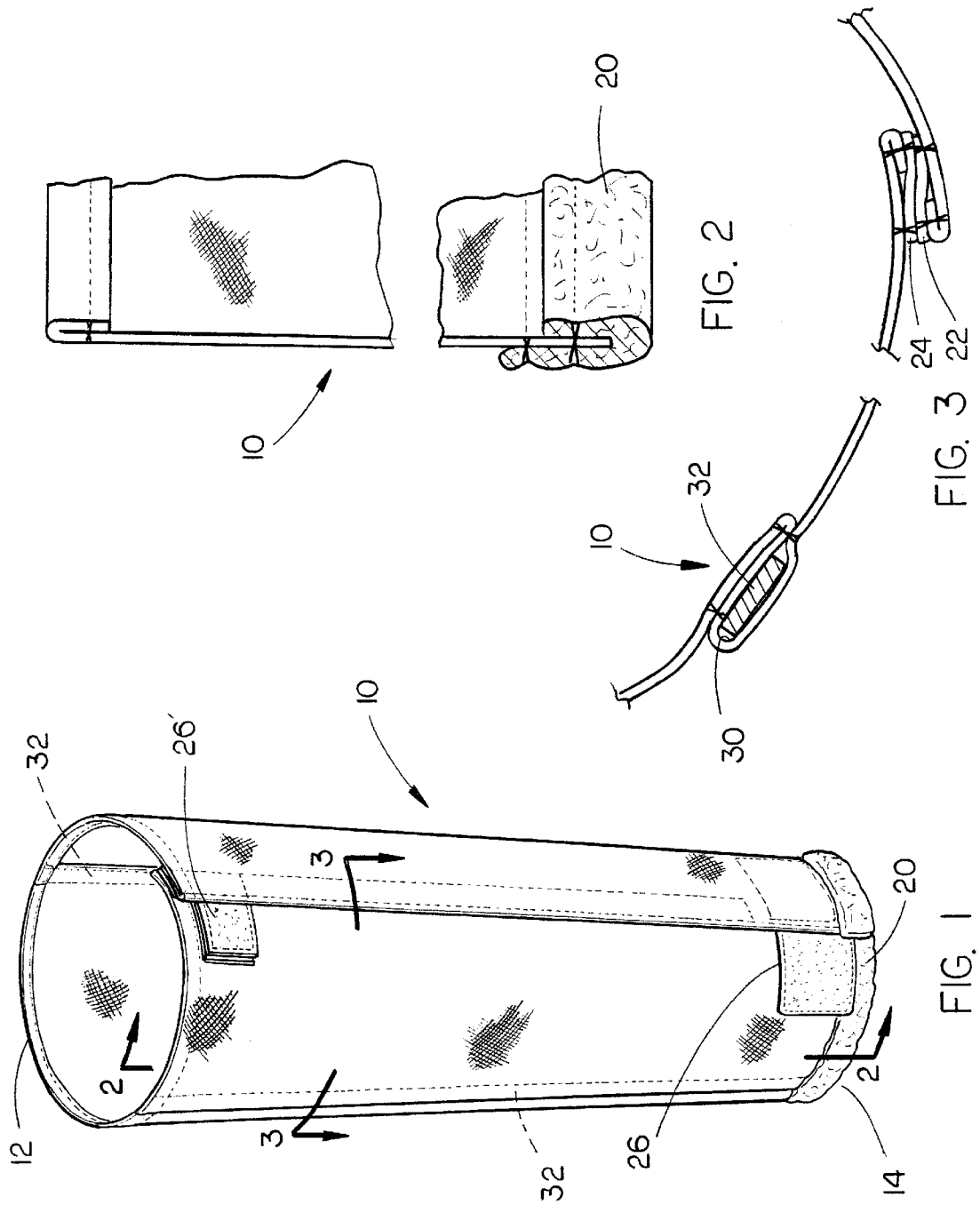

FLY BITE AND BOTFLY PREVENTION LEGGING FOR EQUINE

CROSS-REFERENCE TO RELATED APPLICATION

Applicant filed a provisional application entitled FLY BITE AND BOTFLY PREVENTION LEGGING FOR EQUINE which was accorded Ser. No. 60/166,374 and a filing date of Nov. 18, 1999.

BACKGROUND OF THE INVENTION

1. Field of the Invention

This invention relates generally to apparel to be worn by equines on their lower legs to prevent flies from biting or laying eggs.

2. Description of the Related Art

Flies inflict painful bites on horses, mules and burros, especially their legs. Horse owners use a wide variety of commercial and homemade chemicals applied by various means in an effort keep flies off their animals, especially their legs. These chemicals are costly and occasionally damage the environment. The chemicals have a short useful time span and must be applied numerous times a day to be marginally effective.

When a fly gets on a horse's leg and bites, the horse will generally lift its foot and stamp it to the ground, causing impact to its foot and hoof. Continually stomping will sometimes damage the hoof by chipping pieces off until the hoof becomes unnaturally short and tender. This condition could lead to laminitis, a painful and disabling condition resulting in the separation of the laminae in the equine hoof. Continual stamping is also believed to loosen the horseshoes on the hooves.

Any uncovered area of the equine lower legs is also a natural depository for Botfly eggs which are deposited on the hair. Equine will ingest these eggs and are then infected with the larvae of the Botfly. This larvae causes permanent damage to the intestinal tract of the animal. Typical prior art leg fly bite prevention apparatus are tight-fitting and will sag when used, exposing the animal's lower leg to flies. Flies are also attracted to any open wound on an animal and will deter the natural healing process.

SUMMARY OF THE INVENTION

A fly bite and Botfly prevention legging is provided for equines to be worn on their front and back legs to prevent flies from biting or laying Botfly eggs on their legs. A fully opening vertical seam of hook and loop fasteners is used to attach the legging to the animal. A bottom placed strap of hook and loop going around the animal's lower foremost leg is used to adjust the legging for different sized animals. Staves are utilized in the legging to prevent the legging from sagging.

It is therefore a general object of the present invention to provide an improved method to prevent flies from biting, laying eggs or retarding healing of a wound on the front or back lower legs of equines.

Yet another object is to provide a fly prevention apparel which overcomes the problems of the prior art as related to fly bite and Botfly eggs deposited on the animal's lower legs.

Yet another object is to provide loose-fitting mesh plastic fabric legging apparel designed to be comfortably worn on the lower legs of the animals.

Yet another object is to provide a vertical seam for ease of attachment.

Still another object of the invention is to provide a means of hook and loop attachment to secure the vertical seam which is convenient for the horseman/horsewoman to use in attaching the legging on the animal's lower legs.

Still another object of the invention is to provide a lowermost adjusting strap using hook and loop to ensure proper fitting around the animal's leg.

Yet another object of the invention is to provide a means to prevent the apparel from sagging by strategically located vertical placed flexible staves.

Yet another object of the invention is to provide a material which can be easily washed and dried.

A further object of the invention is to provide a means to allow free air movement around the animal's leg by providing space between the legging and the animal's leg surface.

These and other objects will be apparent to those skilled in the art.

BRIEF DESCRIPTION OF THE DRAWINGS

FIG. 1 is a perspective view of the legging of this invention;

FIG. 2 is a partial sectional view seen on lines 2—2 of FIG. 1;

FIG. 3 is an enlarged sectional view seen on lines 3—3 of FIG. 1;

DESCRIPTION OF THE PREFERRED EMBODIMENT

Figure 4:
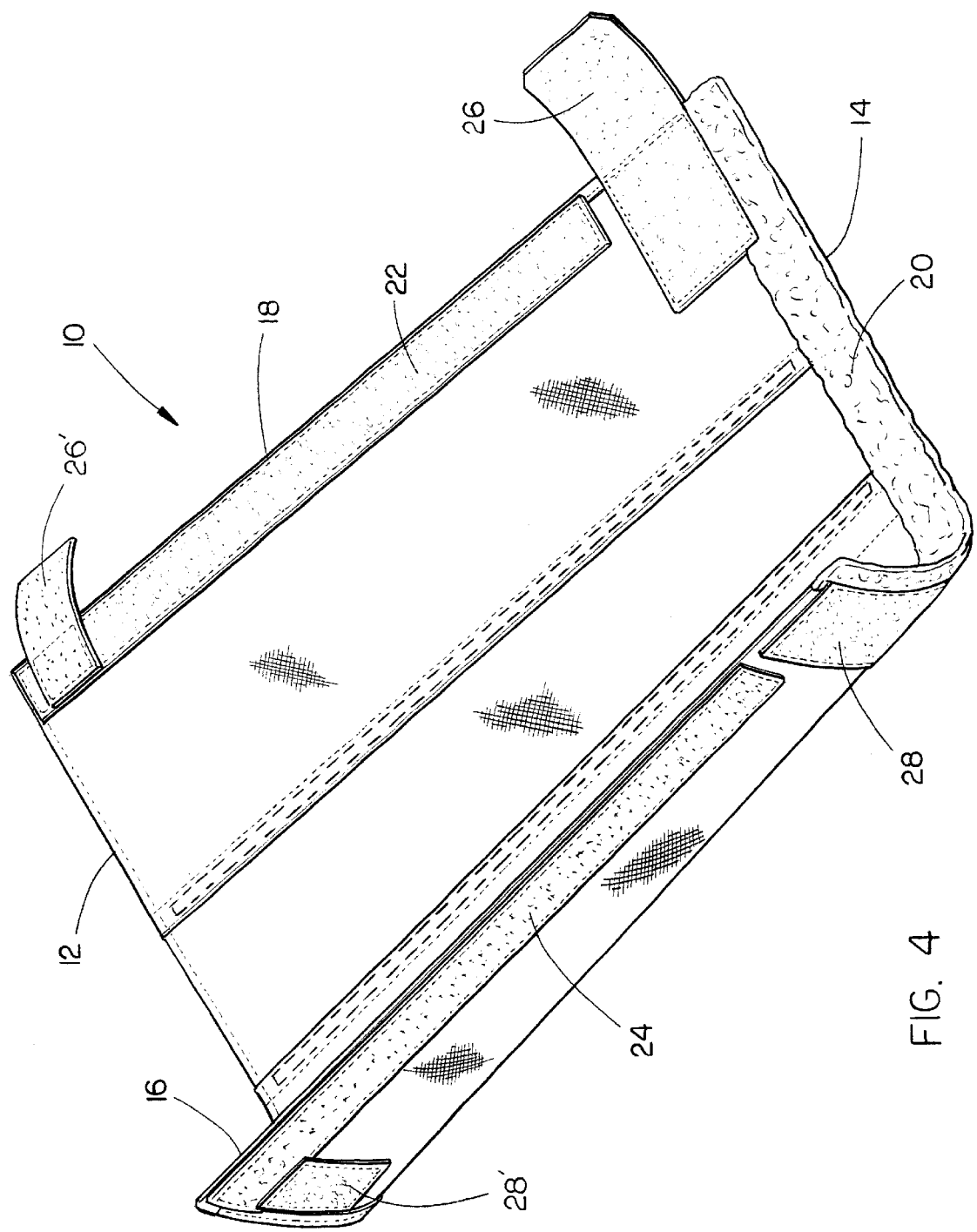
FIG. 4 is a perspective view of the legging.

The legging of this invention is referred to generally by the reference numeral 10 with the legging being of the truncated, conical-shaped configuration when viewed in plan form. Legging 10 includes an upper edge 12, lower edge 14, and opposite side edges 16 and 18. A fleece or sheepskin-like material 20 is mounted on the lower end of the legging 10 and is positioned on the inner and outer surfaces of the legging, as illustrated in FIG. 4.

The inside surface of the legging 12 adjacent edge 18 is provided with an elongated strip of the loop material 22 which is adapted to releasably receive the elongated strip of hook material 24 secured to the outer surface of the legging 10 adjacent edge 16. The hook and loop fasteners are commonly referred to as the Velcro™-type hook and loop fasteners.

A strap 26 comprising a loop-type material is secured to the lower interior surface of the legging 10, as illustrated in FIG. 4, and is adapted to be releasably connected to the strap 28 secured to the lower exterior surface of the legging 10 with the strap 28 being constructed of the hook-type material with the straps 26 and 28 forming what is commonly called a Velcro™-type connector. A strap 26' comprising a loop-type material is secured to the upper interior surface of the legging 10, as illustrated in FIG. 4, and is adapted to be releasably connected to the strap 28' secured to the upper exterior surface of the legging 10 with the strap 28' being constructed of the hook-type material with the strap 26' and 28' forming what is commonly called a Velcro™-type connector.

Legging 10 is provided with a plurality of elongated compartments or pockets 30 formed therein, as illustrated in FIG. 3, which are adapted to receive the semi-flexible plastic stiffeners 32 therein.

Legging 10 is preferably constructed of a plastic mesh material which permits air to pass therethrough, but which prevents flies or the like from passing therethrough.

Figures 5, 6:
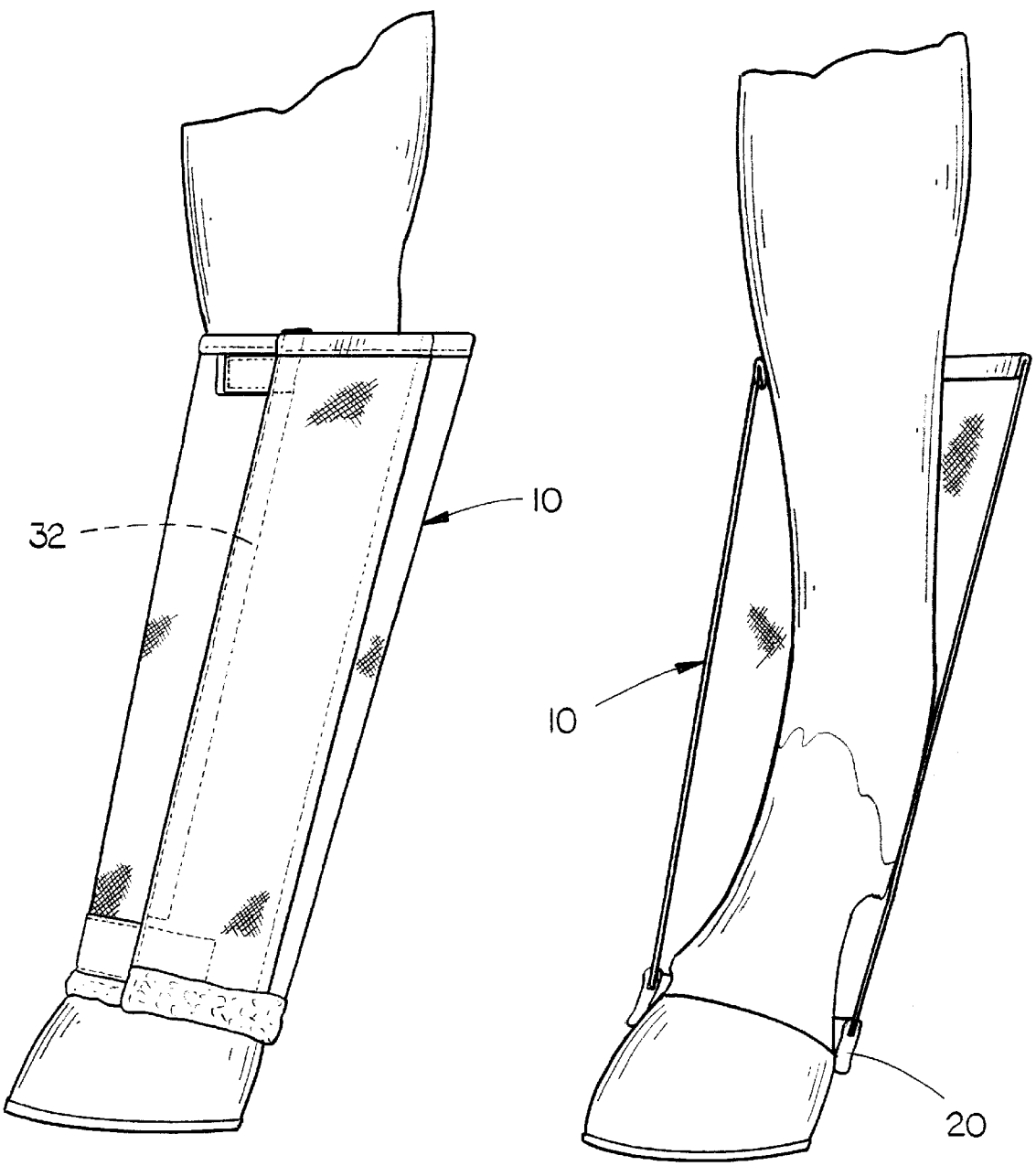
FIG. 5 is a side elevational view of the legging mounted on the leg of an animal.
FIG. 6 is a view similar to FIG. 5 except that portions of the legging have been cut away to more fully illustrate the invention.

The legging 10 is wrapped around the animal's leg, as illustrated in FIGS. 5 and 6, with the fleece material 20 resting upon the hoof area of the animal's feet. When the legging is installed on the leg of the animal, as illustrated in FIGS. 5 and 6, the device is loose fitting so that air can circulate therethrough. The mesh construction of the legging permits air to pass therethrough, but prevents flies from passing therethrough. The legging device of this invention provides an improved method to prevent flies from biting and laying eggs which retards the healing of a wound on the front or back of the lower legs of equines. The legging of this invention is loose fitting and is designed to be comfortably worn on the lower legs of the animals. The hook and loop attachment means utilized on the invention provides a convenient means for the horseman/horsewoman to use in attaching the legging on the animal's lower legs. The lowermost adjusting strap members 26 and 28 enable the leggings to be adjustably secured to the animal wherein the proper fit is provided around the animal's leg. The uppermost strap members 26' and 28' aid in ensuring that the legging stays in place on the leg of the animal. The stiffening or stave members prevent the legging from sagging so that the legging adequately protects the lower legs of the animal.

Thus it can be seen that the invention accomplishes at least all of its stated objectives.

I claim:

1. A fly bite and botfly prevention legging for equines, comprising:

a flexible legging member having inner and outer surfaces;

said legging member having an upper edge, a lower edge, and first and second side edges having upper and lower ends;

a cushioning material on said lower edge of said legging member;

a first strip of hook material, having upper and lower ends, secured to said outer surface of said legging member adjacent said first edge which extends from said upper edge towards said lower edge;

a first strip of loop material, having upper and lower ends, secured to said inner surface of said legging member adjacent said second edge which extends from said upper edge towards said lower edge for selective releasable engagement with said first strip of hook material;

a second strip of hook material secured to said outer surface of said legging member which extends laterally from said upper end of said first strip of hook material;

a third strip of hook material secured to said outer surface of said legging member which extends laterally from said first edge adjacent said lower edge;

a second strip of loop material secured to said legging member adjacent said upper end of said first strip of loop material and which extends laterally outwardly from said second edge for selective releasable engagement with said second strip of hook material;

a third strip of loop material secured to said legging member adjacent said lower end of said second side edge which extends laterally outwardly from said second side edge for selective releasable engagement with said third strip of hook material;

said legging member being supported in a vertical position on the leg of the equine by vertically disposed flexible staves which extend substantially between said upper and lower ends of said legging member;

said legging member being of a mesh construction to permit air to pass therethrough;

said legging member being adapted to loosely fit on the equine's leg to define a space between the inner surface of the legging member and the leg of the equine.

\* \* \* \* \*